United States Patent
Nakamura

[11] 4,165,916
[45] Aug. 28, 1979

[54] OBJECTIVE LENS SYSTEM WITH CLOSE OBJECT FOCUSING ABERRATION CORRECTION

[75] Inventor: Akiyoshi Nakamura, Sakai, Japan

[73] Assignee: Minolta Camera Kabushiki Kaisha, Osaka, Japan

[21] Appl. No.: 815,376

[22] Filed: Jul. 13, 1977

[30] Foreign Application Priority Data

Jul. 16, 1976 [JP] Japan .................................. 51/85244

[51] Int. Cl.² ............................ G02B 9/62; G02B 9/60
[52] U.S. Cl. .................................... 350/215; 350/209; 350/210; 350/216
[58] Field of Search ............... 350/215, 207, 209, 210, 350/255, 216

[56] References Cited

U.S. PATENT DOCUMENTS

| | | | |
|---|---|---|---|
| 2,677,989 | 5/1954 | Tronnier | 350/210 |
| 3,524,700 | 8/1970 | Eggert et al. | 350/215 X |
| 3,883,228 | 5/1975 | Betensky | 350/215 X |

FOREIGN PATENT DOCUMENTS

2364469  9/1974  Fed. Rep. of Germany ........... 350/216

*Primary Examiner*—Paul A. Sacher
*Attorney, Agent, or Firm*—Jackson, Jones & Price

[57] ABSTRACT

An objective lens system, for example of a Gauss or Tessar type is provided having the capability of adequately correcting aberrations even when the lens system is focussed at a relatively close object. The lens system is adaptable for use in cameras and comprises a first lens group including an aperture stop and a second lens group positioned on the image side of the first lens group. The second lens group includes a first lens sub-group of positive refracting power and a second lens sub-group of negative refractive power. The air spaces provided between the first lens group and the first lens sub-group and also between the first lens sub-group and the second lens sub-group are varied to compensate for changes in aberrations resulting from focussing at a relatively close object. More specifically, the first air space is increased while the second air space is decreased when the object distance of the lens system is decreased.

14 Claims, 56 Drawing Figures

Spherical Aberration

Astigmatism

Distortion

Coma

Spherical Aberration

Astigmatism

Distortion

Coma

Spherical Aberration

Astigmatism

Distortion

Coma

Spherical Aberration

Astigmatism

Distortion

Coma

Spherical Aberration

Astigmatism

Distortion

Coma

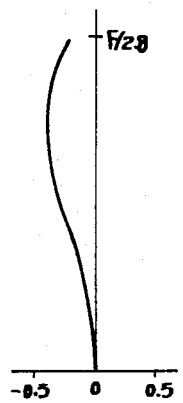
FIG.10a
Spherical Aberration
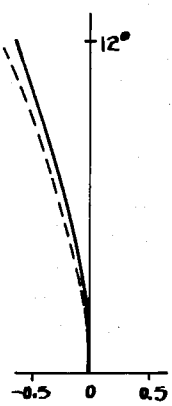
FIG.10b
Astigmatism
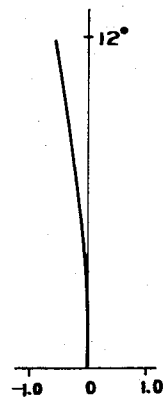
FIG.10c
Distortion
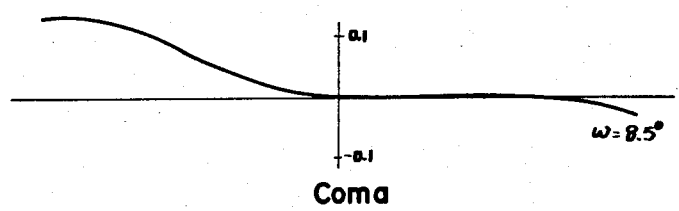
FIG.10d
Coma
FIG.11
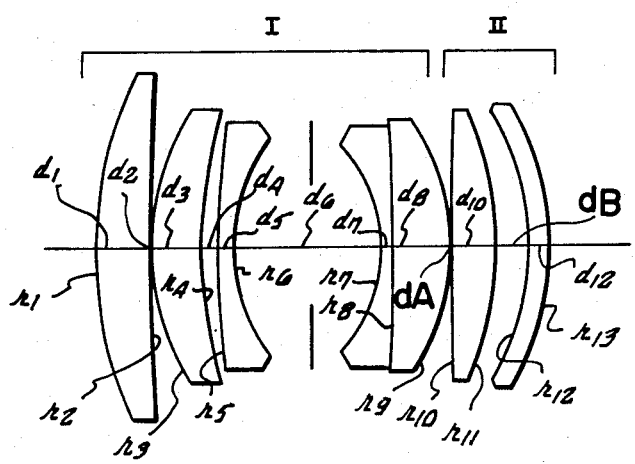

Spherical Aberration

Astigmatism

Distortion

Coma

Spherical Aberration

Astigmatism

Distortion

Coma

Spherical Aberration

Astigmatism

Distortion

Coma

Spherical Aberration

Astigmatism

Distortion

Coma

Spherical Aberration

Astigmatism

Distortion

Coma

Spherical Aberration

Astigmatism

Distortion

Coma

OBJECTIVE LENS SYSTEM WITH CLOSE OBJECT FOCUSING ABERRATION CORRECTION

BACKGROUND OF THE INVENTION

1. Field of the Invention

This invention relates to a photographic camera objective lens system, for example of the Gauss or Tessar type having a tendency to increase various aberrations when the photographic object is relatively close to the lens system, and more particularly to such an objective lens system which incorporates means for compensating aberrations when focussing at a close object.

2. Brief Description of the Prior Art

The prior art is familiar with the aberration problems that are created when it is desired to utilize a lens system for focussing at relatively close objects. For example, a lens system is known wherein an air space behind a diaphragm in the lens system is provided before a positive overall refractive power lens group. This air space is varied in coordination with focussing to compensate for any changes in aberrations. The axial rays passing through this air space are convergent. Thus, by widening this air space the height of the axial rays relative to the optical axis that are incident on the positive lens group can be reduced to accordingly reduce the refraction of the axial rays by the positive lens group and thereby compensate for spherical aberrations. Additionally, the height of the off-axial rays incident on the same positive lens group will also be varied to compensate for astigmatism and coma. An example of such an optical design approach to compensate for these aberrations is disclosed in U.S. Pat. No. 3,815,974.

However, a design problem exists, in that the convergent axial rays in the variable air space become divergent when the object distance becomes sufficiently close. Accordingly, when photographing an object at a relatively close distance a point will be reached in which it is no longer possible to obtain an effective compensation for spherical aberration. If this focussing range is sought to be increased by maintaining the convergence of the axial rays in the variable air space, the lens group at the object side of the variable air space must be provided with a considerably strong positive refractive power. The provision of this power distribution in the lens system, however, would create problems and would not provide a desirable design solution.

Another patent of general interest for its disclosure of various air spaces in a photocopier application can be found in U.S. Pat. No. 3,883,228.

The prior art is still seeking an optical design to optimize the correction of aberrations when focussing at close distances within a commercial priced lens system for the average photographer.

SUMMARY OF THE INVENTION

An object of the present invention is to overcome the compensation problems associated with focussing on an object at a relatively close distance, while at the same time providing a lens system that is capable of providing a balanced compensation for spherical aberration, astigmatism and coma.

Accordingly, an objective lens system for cameras and the like with a close focussing capability is provided having a first lens group which includes an aperture stop. On the image side of the first lens group, a second lens group is positioned and defines with the first lens group a first air space. The second lens group can be subdivided into a first lens sub-group of positive refractive power and a second lens sub-group of negative refractive power. The first and second lens sub-groups are spaced from each other to form a second air space.

Compensation for aberrations is provided by a compensation means which can increase the relative first air space displacement of the first lens group and the first lens sub-group when the object distance of the lens system is decreased during focussing at a close object. While, at the same time, the compensation means can decrease the second air space between the first and second lens sub-groups. The compensation means thereby provides adequate compensation for aberrations resulting from focussing at a close object.

Any variation in the focal length f, of the lens system resulting from variations in the axial air spaces, dA and dB, if any, are maintained with ±3 percent of the focal length of the lens system while focussed at infinity.

The features of the present invention which are believed to be novel are set forth with particularity in the appended claims. The present invention, both as to its organization, and manner of operation, together with further objects and advantages thereof, may be best understood by reference to the following description, taken in conjunction with the accompanying drawings.

BRIEF DESCRIPTION OF THE DRAWINGS

FIGS. 10a, 10b, 10c and 10d, are the respective aberration curves for the lens system of FIG. 6 focussed at an object distance corresponding to a magnification of 0.25 without varying the variable air spaces;

FIG. 11 shows a schematic cross-sectional view of a third embodiment of the present invention focussed at infinity;

BRIEF DESCRIPTION OF THE PREFERRED EMBODIMENTS

The following description is provided to enable any person skilled in the optical art to make and use the invention and sets forth the best modes contemplated by the inventor of carrying out his invention. Various modifications, however, will remain readily apparent to those skilled in the art, since the generic principles of the present invention has been defined herein specifically to provide an objective lens system with close focussing capabilities.

The derivation of the values and their relationships as set forth in the tables, hereinafter, can be accomplished with the assistance of a computer. The present invention represents the parameters of a compromised balance of acceptable aberrations in an objective lens system for utilization, for example, with a camera.

In the accompanying drawings, which supplement the tables, the lenses in accordance with the present invention, are illustrated diagrammatically using reference symbols which indicate groups of lenses. As usual, in conventional lens diagrams, the light is assumed to travel from left to right, the radii of curvature of the lens are indicated by, r, with a subscript corresponding to consecutive surfaces of the lens elements and the axial spacings, d, along the optical axis are also indicated with a consecutive subscript. In the tables, the minus signs indicate surfaces concave toward the object side, while the surfaces without a sign are convex toward the object side. The value of the axial spacing symbol, d, includes both the axial spacing between the lens elements and the thickness of the lens elements. The axial spacings between the lens elements are positioned accordingly relative to the radii in the tables while the thicknesses are designated accordingly between the radii. Zero axial spacing indicates lens elements cemented to each other. All other axial spacings greater than zero refer to air spacings.

All linear dimensions are given in absolute values and are given with reference to the equivalent focal length of unity. The tables also provide with respect to each example, the intended relative aperture, the total angle of view, $2\omega$, and the back focal length, S, with reference to an object at infinity.

Figure 1:
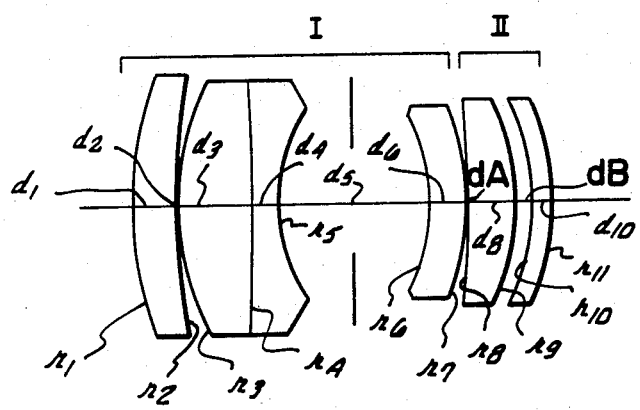
FIG. 1 is a schematic cross-sectional view of a first embodiment of the present invention focussed at infinity.
Figure 2A:
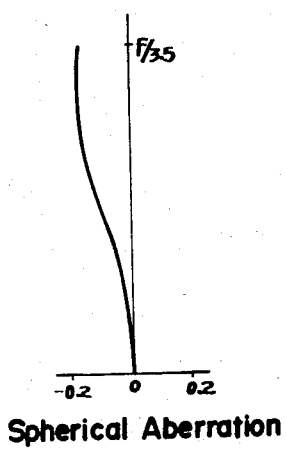
FIGS. 2a, 2b, 2c and 2d disclose respectively the spherical aberration, astigmatism, distortion and coma for the lens system of FIG. 1.
Figure 2B:
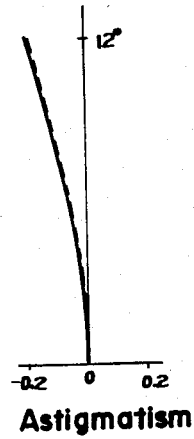
Figure 2C:
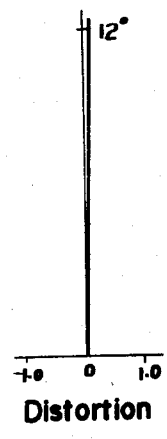
Figure 2D:
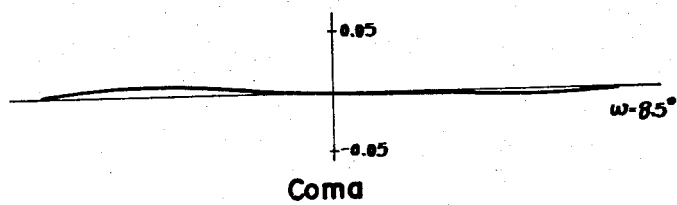

Referring specifically to FIG. 1, a first embodiment of the present invention is schematically disclosed with the lens elements therein positioned for photographing at infinity.

A first lens group (I) can have either a positive or negative overall refractive power and includes a diaphragm or aperture stop. A second lens group (II) is axially displaced from the first lens group and has a positive overall refractive power. The resulting air space, dA, between the first lens group and the second lens group can be varied in association with focussing. Taking into account the appropriate design considerations, the height of the off-axial rays incident on the second lens group off the optical axis, can be varied to correct for astigmatism and coma.

The second lens group (II) comprises a positive lens and a negative meniscus lens respectively from object to image side and includes a second air space, dB, between these two lenses. The second air space has a cross-sectional configuration of a meniscus air lens with its concave side facing the diaphragm. By varying this second air space, dB, the distance of the intersection or incidence of the convergent axial rays, emergent from the positive lens, and off-set from the optical axis can be varied on the negative meniscus lens. Thus, when dB is narrowed, the height from the optical axis of the axial rays incident on the negative meniscus lens is increased so that the negative refractive power of the negative meniscus lens exerts a greater influence on the axial rays to positively displace the spherical aberration. In this arrangement, the axial rays in the air space, dA, need not be convergent, however, if the rays are convergent in the air space, dA, the spherical aberration can also be corrected in the same manner associated with the displacement or variation of the air space dB.

Because the air space of air lens, dB, has a configuration of a meniscus lens with its concave side facing the diaphragm, any variation in the axial spacing of dB, produces substantially no astigmatism. Therefore, the present inventor has discovered that by shifting the lens system for photographing a close object with magnification in the range of 0.25, a satisfactory aberration condition can always be maintained by increasing the air space, dA, especially to correct for astigmatism and coma. Further, by decreasing the air space, dB, it is possible to correct the spherical aberration.

FIGS. 2a, 2b, 2c and 2d show various aberration curves for respectively spherical aberration, astigmatism, distortion and coma when the lens system of FIG. 1 is focused at infinity.

Figure 3:
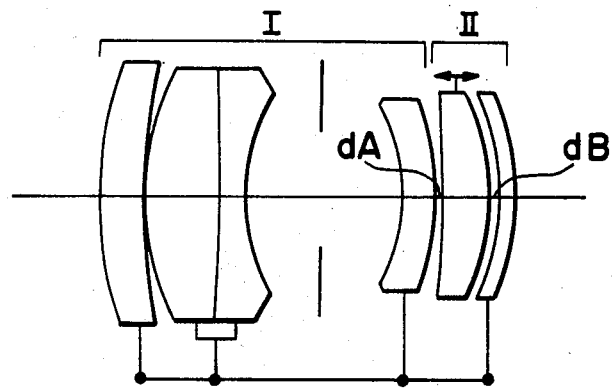
FIG. 3 is a schematic cross-sectional view of FIG. 1 focussed at an object distance corresponding to a magnification of 0.25.
Figure 4A:
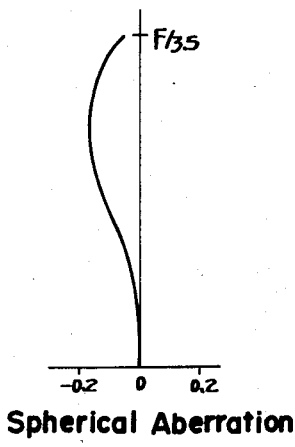
FIGS. 4a, 4b, 4c and 4d respectively show the spherical aberration, astigmatism, distortion and coma for the lens system of FIG. 3.
Figure 4B:
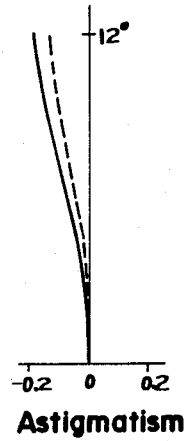
Figure 4C:
Figure 4D:
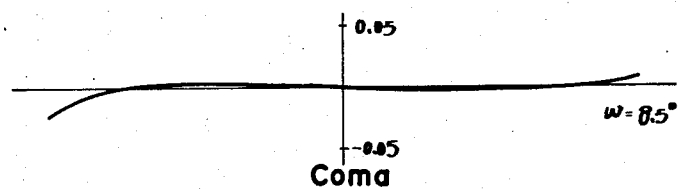
Figure 5A:
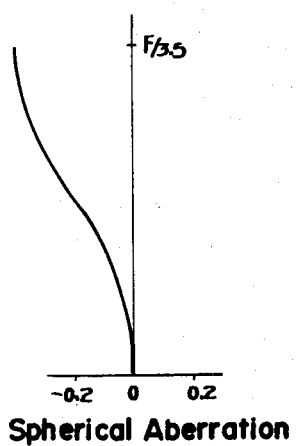
FIGS. 5a, 5b, 5c and 5d disclose the respective aberration curves resulting when the lens system of FIG. 1 has been shifted to a magnification of 0.25 without varying the variable air spaces.
Figure 5B:
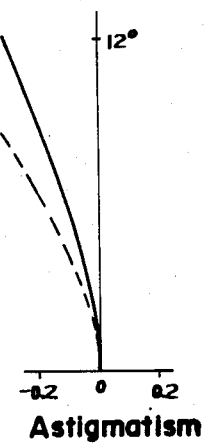
Figure 5C:
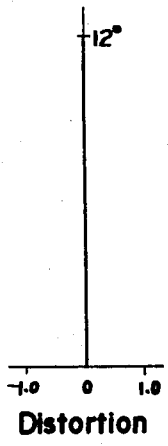
Figure 5D:
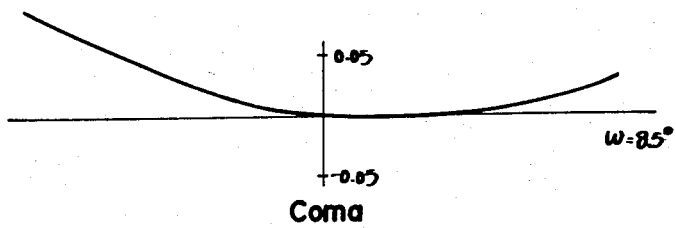

The schematic cross-sectional view of the lens system of FIG. 3 discloses the lens system of FIG. 1 shifted to focus on a close object so that the magnification is $\beta = 0.25$. As can be seen from FIG. 3, the positive lens of the second lens group has been shifted toward the image side relative to the entire system when compared with FIG. 1 to thereby increase the air space dA, and decrease the air space dB. This shifting produces the desirable intersection or incidence of the convergent axial rays to thereby adequately compensate for the various aberrations. This compensation can be seen in the graphs of FIGS. 4a, 4b, 4c and 4d. In this arrangement, the air space $dA = 0.012$ and the air space $dB = 0.011$ with a lens system focal length $f = 1.002$.

Simply for comparison sake, FIGS. 5a, 5b, 5c and 5d show aberration curves that have been plotted to disclose the situation that occurs when the lens system of Table 1 has been shifted to a magnification of $\beta=0.25$ without varying the air spaces dA and dB.

TABLE 1

| Radius of Curvature | | Axial Distance | Refractive Index | Abbe Number |
|---|---|---|---|---|
| $r_1$ = | 0.452 | | | |
| | | $d_1 = 0.048$ | $N_1 = 1.7755$ | $\nu_1 = 37.9$ |
| $r_2$ = | 0.788 | | | |
| | | $d_2 = 0.003$ | | |
| $r_3$ = | 0.293 | | | |
| | | $d_3 = 0.082$ | $N_2 = 1.6779$ | $\nu_2 = 55.5$ |
| $r_4$ = | −16.234 | | | |
| | | $d_4 = 0.028$ | $N_3 = 1.6545$ | $\nu_3 = 33.9$ |
| $r_5$ = | 0.201 | | | |
| | | $d_5 = 0.174$ | | |
| $r_6$ = | −0.223 | | | |
| | | $d_6 = 0.04$ | $N_4 = 1.6815$ | $\nu_4 = 36.8$ |
| $r_7$ = | −0.348 | | | |
| | | $d_7 = 0.003$ | (dA:Variable) | |
| $r_8$ = | −1.916 | | | |
| | | $d_8 = 0.05$ | $N_5 = 1.6589$ | $\nu_5 = 56.5$ |
| $r_9$ = | −0.282 | | | |
| | | $d_9 = 0.02$ | (dB:Variable) | |
| $r_{10}$ = | −0.271 | | | |
| | | $d_{10} = 0.02$ | $N_6 = 1.6583$ | $\nu_6 = 57.4$ |
| $r_{11}$ = | −0.329 | | | | f=1.0 FNo.=3.5 2ω=24° Back Focal Length S=0.69

Figure 6:
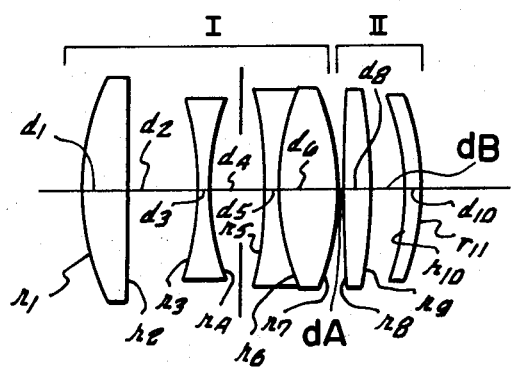
FIG. 6 discloses a schematic cross-sectional view of a second embodiment of the present invention focussed at infinity.
Figure 7A:
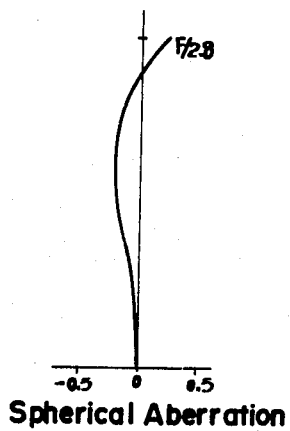
FIGS. 7a, 7b, 7c and 7d show respectively the spherical aberration, astigmatism, distortion and coma of the lens system of FIG. 6.
Figure 7B:
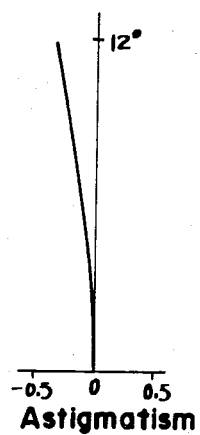
Figure 7C:
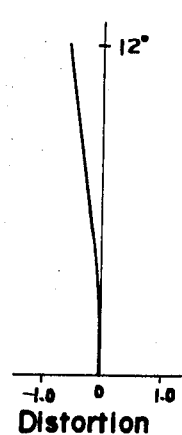
Figure 7D:
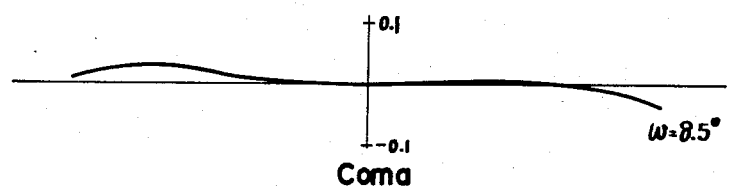

A second embodiment of the present invention is disclosed in FIG. 6. The purpose of the air spacing and its effect on the incident axial rays are the same as described with respect to the first embodiment and, therefore, it is not necessary to repeat this description. The aberration curves for the second embodiment, focussed at infinity, are shown respectively in FIGS. 7a, 7b, 7c and 7d.

Figure 8:
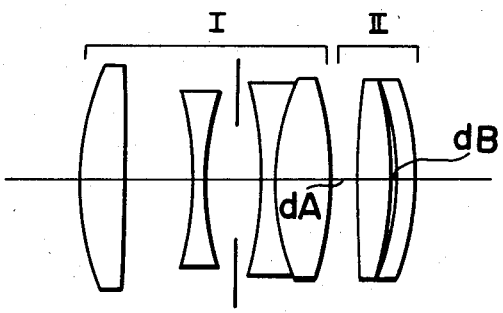
FIG. 8 shows the lens system of FIG. 6 focussed at an object distance corresponding to a magnification of 0.25.
Figure 9A:
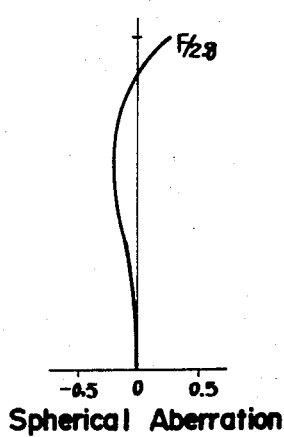
FIGS. 9a, 9b, 9c and 9d show respectively the spherical aberration, astigmatism, distortion and coma of the lens system of FIG. 8.
Figure 9B:
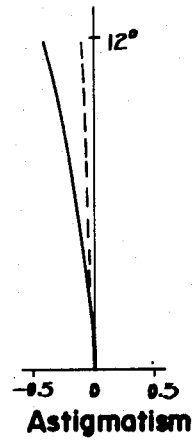
Figure 9C:
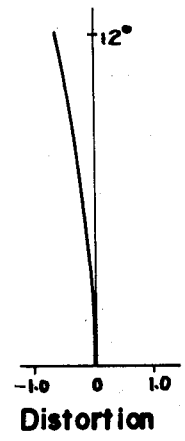
Figure 9D:
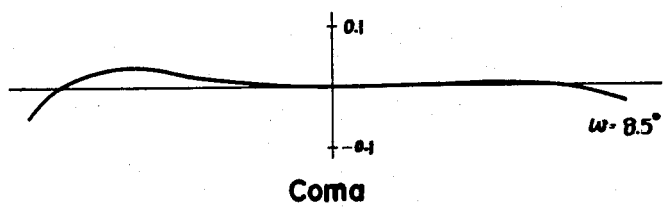
Figure 12A:
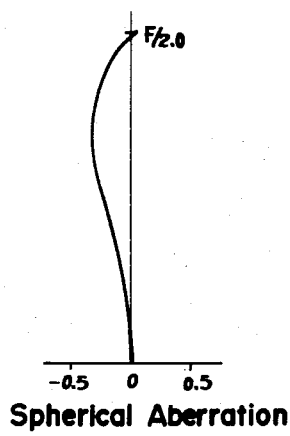
FIGS. 12a, 12b, 12c and 12d show the resulting aberration curves for the embodiment of FIG. 11 when focussed at infinity.
Figure 12B:
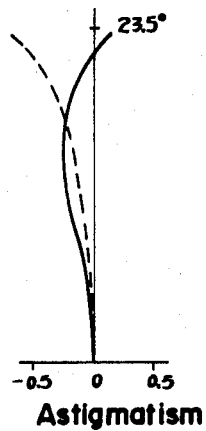
Figure 12C:
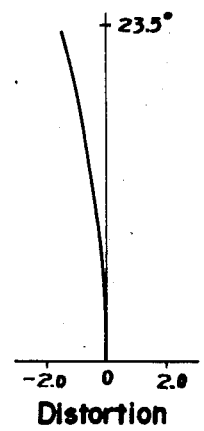
Figure 12D:
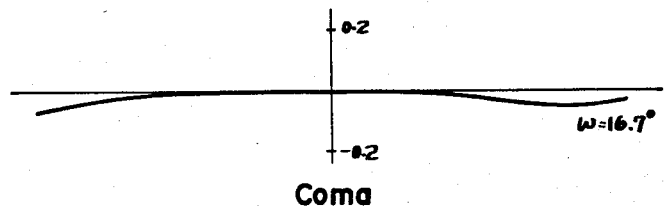

FIG. 8 discloses the second embodiment with the lens system focussed at a relatively close distance, magnification $\beta=0.25$, dA=0.048 and dB=0.013 with a focal length, f=1.009. The resultant aberration curves for this close focus position are shown respectively in FIGS. 9a, 9b, 9c and 9d. FIGS. 10a, 10b, 10c and 10d are the respective aberration curves produced when the lens system of FIG. 6 has been shifted for close focussing, $\beta=0.25$ (without varying the air spaces dA and dB).

TABLE 2

| Radius of Curvature | | Axial Distance | Refractive Index | Abbe Number |
|---|---|---|---|---|
| $r_1$ = | 0.484 | | | |
| | | $d_1 = 0.072$ | $N_1 = 1.6661$ | $\nu_1 = 47.9$ |
| $r_2$ = | −6.382 | | | |
| | | $d_2 = 0.114$ | | |
| $r_3$ = | −0.638 | | | |
| | | $d_3 = 0.024$ | $N_2 = 1.6741$ | $\nu_2 = 31.9$ |
| $r_4$ = | 0.465 | | | |
| | | $d_4 = 0.092$ | | |
| $r_5$ = | −0.794 | | | |
| | | $d_5 = 0.024$ | $N_3 = 1.5821$ | $\nu_3 = 42.0$ |
| $r_6$ = | 0.383 | | | |
| | | $d_6 = 0.096$ | $N_4 = 1.658$ | $\nu_4 = 51.4$ |
| $r_7$ = | −0.552 | | | |
| | | $d_7 = 0.011$ | (dA:Variable) | |
| $r_8$ = | 3.105 | | | |
| | | $d_8 = 0.05$ | $N_5 = 1.6661$ | $\nu_5 = 47.9$ |
| $r_9$ = | −0.776 | | | |
| | | $d_9 = 0.05$ | (dB:Variable) | |
| $r_{10}$ = | −0.456 | | | |
| | | $d_{10} = 0.03$ | $N_6 = 1.6661$ | $\nu_6 = 47.9$ |
| $r_{11}$ = | −0.491 | | | | f=1.0 FNo.=2.8 2ω=24° Back Focal Length S=0.81

A third embodiment of the present invention is shown in a schematic view as FIG. 11 with the lens system focussed at infinity. The resultant aberration curves for this mode of operation is shown respectively in FIGS. 12a, 12b, 12c and 12d.

Figure 13:
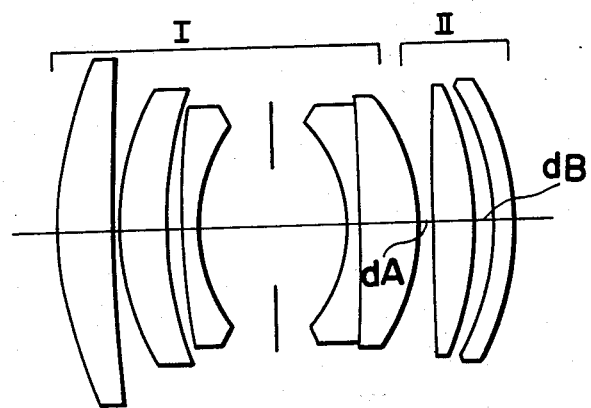
FIG. 13 is a schematic view of FIG. 11 focussed to an object distance corresponding to a magnification of 0.25.
Figure 14A:
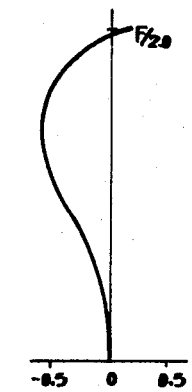
FIGS. 14a, 14b, 14c and 14d show the resulting aberration curves for the lens system of FIG. 13.
Figure 14B:
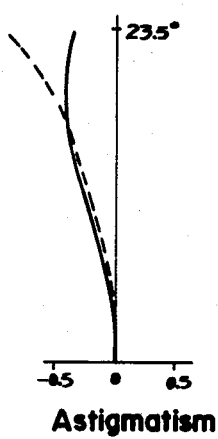
Figure 14C:
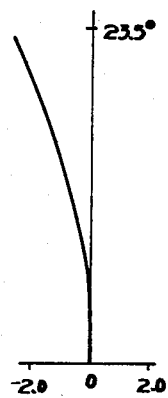
Figure 14D:
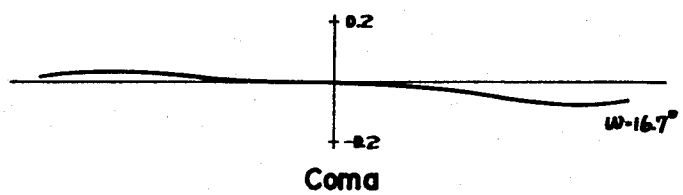
Figure 15A:
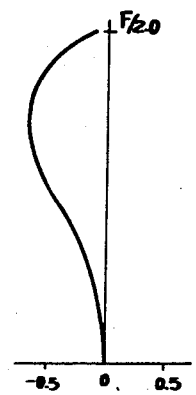
FIGS. 15a, 15b, 15c and 15d are the aberration curves for the embodiment of FIG. 11 when the lens groups have been shifted to a magnification of 0.25 without varying the variable air spaces.
Figure 15B:
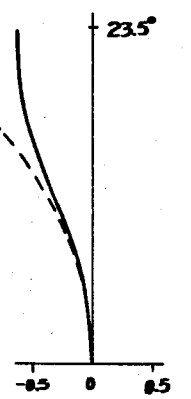
Figure 15C:
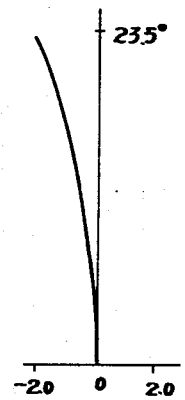
Figure 15D:
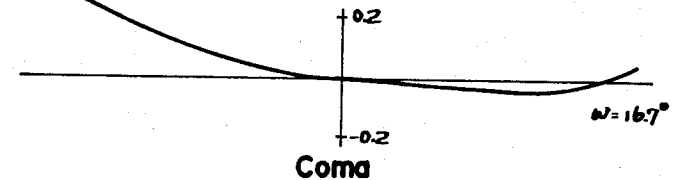

FIG. 13 shows the lens system of FIG. 11 focused at a close distance, $\beta=0.25$, wherein dA=0.025 and dB=0.038. In this particular lens design, the focal length, f=1.000 can be maintained. The aberration curves for this close focussing arrangement is shown respectively in FIGS. 14a, 14b, 14c and 14d. Again, for comparison, aberration curves were derived as disclosed in FIGS. 15a, 15b, 15c and 15d for the lens system of FIG. 11 shifted for close focusing, $\beta=0.25$ without varying the air spaces dA and dB in accordance with the teachings of the present invention to minimize the aberrations.

TABLE 3

| Radius of Curvature | | Axial Distance | Refractive Index | Abbe Number |
|---|---|---|---|---|
| $r_1$ = | 0.666 | | | |
| | | $d_1 = 0.093$ | $N_1 = 1.6935$ | $\nu_1 = 50.3$ |
| $r_2$ = | 5.009 | | | |
| | | $d_2 = 0.004$ | | |
| $r_3$ = | 0.433 | | | |
| | | $d_3 = 0.084$ | $N_2 = 1.6700$ | $\nu_2 = 47.1$ |
| $r_4$ = | 0.695 | | | |
| | | $d_4 = 0.025$ | | |
| $r_5$ = | 1.400 | | | |
| | | $d_5 = 0.027$ | $N_3 = 1.6545$ | $\nu_3 = 33.9$ |
| $r_6$ = | 0.293 | | | |
| | | $d_6 = 0.248$ | | |
| $r_7$ = | −0.273 | | | |
| | | $d_7 = 0.024$ | $N_4 = 1.6477$ | $\nu_4 = 33.9$ |
| $r_8$ = | −3.777 | | | |
| | | $d_8 = 0.097$ | $N_5 = 1.6779$ | $\nu_5 = 55.5$ |
| $r_9$ = | −0.367 | | | |
| | | $d_9 = 0.003$ | (dA:Variable) | |
| $r_{10}$ = | 8.963 | | | |
| | | $d_{10} = 0.07$ | $N_6 = 1.6935$ | $\nu_6 = 51.9$ |
| $r_{11}$ = | −0.577 | | | |
| | | $d_{11} = 0.06$ | (dB:Variable) | |
| $r_{12}$ = | −0.423 | | | |
| | | $d_{12} = 0.03$ | $N_7 = 1.6975$ | $\nu_7 = 58.3$ |
| $r_{13}$ = | −0.454 | | | | f=1.0 FNo.=2 2ω=47° Back Focal Length S=0.71

Figure 16:
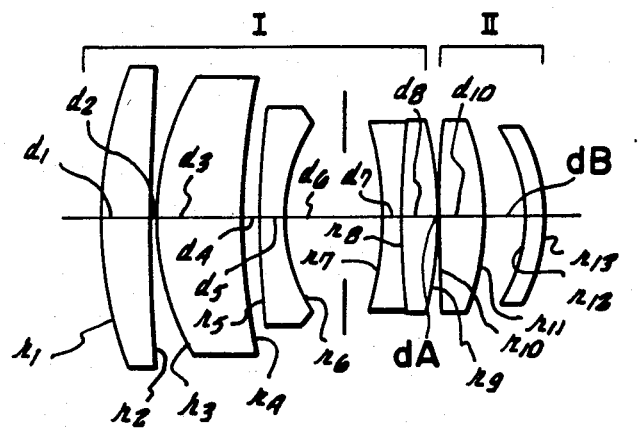
FIG. 16 shows a schematic cross-sectional view of a fourth embodiment of the present invention focussed at infinity.
Figure 17A:
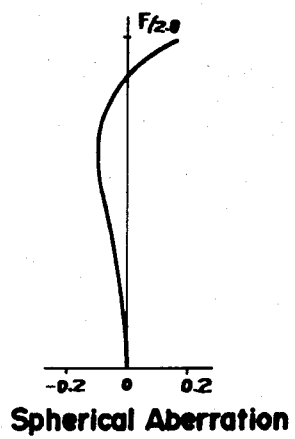
FIGS. 17a, 17b, 17c and 17d, show the various aberration cirves for the lens system of FIG. 16 when focussed at infinity.
Figure 17B:
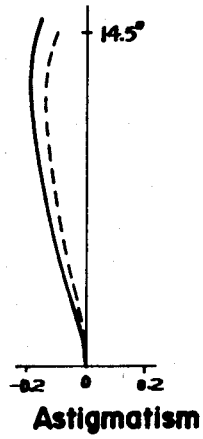
Figure 17C:
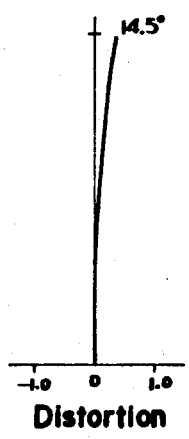
Figure 17D:
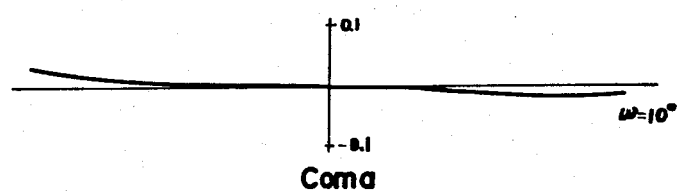

Finally, a fourth embodiment of the present invention is disclosed in FIG. 16 focussed at infinity. The corresponding aberration curves for this mode of focussing operation are disclosed respectively in FIGS. 17a, 17b, 17c and 17d.

Figure 18:
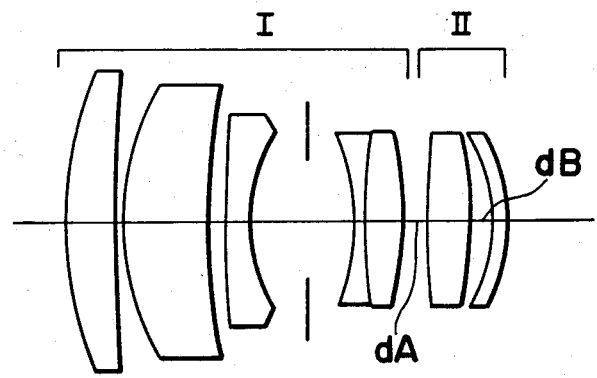
FIG. 18 shows the lens system of FIG. 16 focussed to an object distance corresponding to a magnification of 0.25.
Figure 19A:
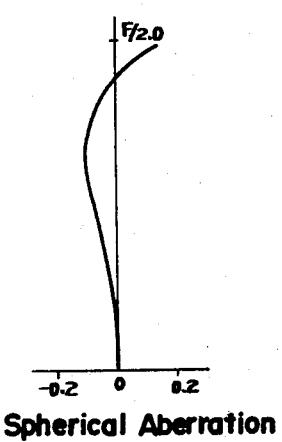
FIGS. 19a, 19b, 19c and 19d show the resulting aberration curves for FIG. 18.
Figure 19B:
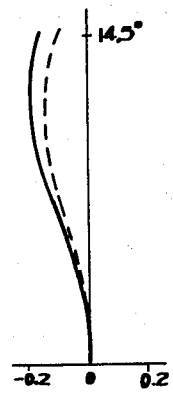
Figure 19C:
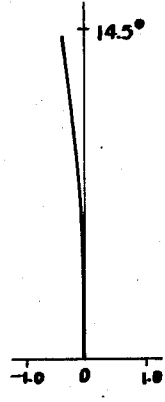
Figure 19D:
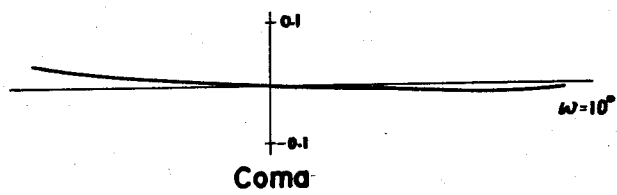
Figure 20A:
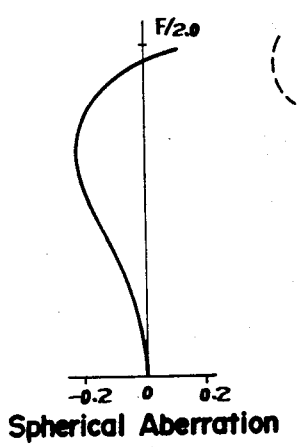
FIGS. 20a, 20b, 20c and 20d show the resulting aberration curves for the embodiment of FIG. 16 when the lens group has been shifted to a magnification of 0.25 without varying the variable air spaces.
Figure 20B:
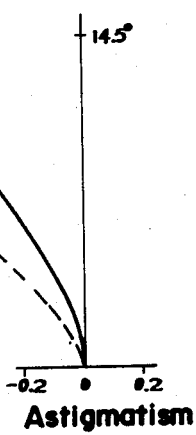
Figure 20C:
Figure 20D:
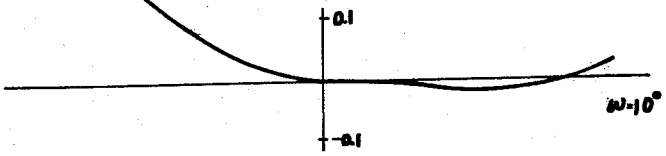

FIG. 18 shows the fourth embodiment of FIG. 16 with the lens elements positioned for close focusing. The magnification is $\beta=0.25$ and air space distances are dA=0.043 and dB=0.029 with a focal length f=1.009. The aberration curves set forth in FIGS. 19a, 19b, 19c and 19d, respectively disclose resulting aberrations with this close focusing position. FIGS. 20a, 20b, 20c and 20d set forth the aberration curves for simply comparison of the lens system of FIG. 16 shifted for a magnification $\beta=0.25$ without varying the air spaces dA and dB.

TABLE 4

| Radius of Curvature | | Axial Distance | Refractive Index | Abbe Number |
|---|---|---|---|---|
| $r_1$ = | 0.708 | | | |
| | | $d_1 = 0.085$ | $N_1 = 1.7495$ | $\nu_1 = 50.4$ |
| $r_2$ = | 3.767 | | | |
| | | $d_2 = 0.007$ | | |
| $r_3$ = | 0.443 | | | |
| | | $d_3 = 0.144$ | $N_2 = 1.7495$ | $\nu_2 = 50.4$ |
| $r_4$ = | 0.899 | | | |
| | | $d_4 = 0.03$ | | | f=1.0 FNo.=2 2ω=29° Back Focal Length S=0.51

TABLE 4-continued

| f=1.0 FNo.=2 2ω=29° Back Focal Length S=0.51 | | | |
|---|---|---|---|
| Radius of Curvature | Axial Distance | Refractive Index | Abbe Number |
| $r_5 = 1.985$ | | | |
| | $d_5 = 0.04$ | $N_3 = 1.733$ | $\nu_3 = 28.1$ |
| $r_6 = 0.270$ | | | |
| | $d_6 = 1.172$ | | |
| $r_7 = -0.415$ | | | |
| | $d_7 = 0.025$ | $N_4 = 1.6645$ | $\nu_4 = 35.7$ |
| $r_8 = 0.997$ | | | |
| | $d_8 = 0.065$ | $N_5 = 1.6779$ | $\nu_5 = 55.5$ |
| $r_9 = -0.633$ | | | |
| | $d_9 = 0.0015$ | (dA:Variable) | |
| $r_{10} = 2.313$ | | | |
| | $d_{10} = 0.075$ | $N_6 = 1.7106$ | $\nu_6 = 43.2$ |
| $r_{11} = -0.541$ | | | |
| | $d_{11} = 0.07$ | (dB:Variable) | |
| $r_{12} = -0.296$ | | | |
| | $d_{12} = 0.03$ | $N_7 = 1.7106$ | $\nu_7 = 43.2$ |
| $r_{13} = -0.315$ | | | |

The values in each of the above Tables 1 through 4 are representative of their corresponding lens systems focussed at infinity.

As can be readily appreciated in veiw of the above description, the present invention utilizes a second lens group comprising, object to image side, a positive lens, a negative meniscus lens with the interposition of a variable air space, dB, therebetween so that spherical aberration may be compensated by taking advantage of the convergence of the axial rays in this variable air space. It should be realized, that the axial rays entering this variable air space dB, need not necessarily be convergent and dA, may be relied upon mainly for the correction of astigmatism and coma. By the specific selection of the aboveidentified lens elements, and their manipulation relative to the air spaces, it is possible to obtain a well-balanced correction for spherical aberration, astigmatism and coma while extending the range of photography to closer distances in the order of a magnification $\beta=0.25$. This is accomplished without placing an excessive design burden on the power of the first lens group. Thus, relatively easily assembled lens system compatible to conventional lens barrels can be produced. The advantages of the present invention are particularly valuable in increasing the relative object distance range for photography in an economical manner while still providing satisfactory aberration compensations to insure a high-quality lens system.

As can be readily appreciated, it is possible to deviate from the above embodiments of the present invention and will be readily understood by those skilled in the art that the invention is capable of many modifications and improvements within the scope and spirit thereof. Accordingly, it will be understood that the invention is not to be limited by the specific disclosed embodiment but only by the scope and spirit of the appended claims.

What is claimed is:

1. An objective lens system for cameras with a close focusing capability comprising;
  a first lens group including an aperture stop;
  a second lens group of an overall positive refractive power spaced from the image side of the first lens group to form a first air space, the second lens group consisting of a first lens sub-group of positive refractive power having an image side convex surface and a second lens sub-group of negative refractive power having an object side concave surface and an image side convex surface, the first and second lens sub-groups being spaced from each other to form a second air space, and
  compensation means for increasing the relative first air space displacement of the first lens group and the first lens sub-group when the object distance of the lens system is decreased during focusing and decreasing the relative second air space between the first and second lens sub-groups to compensate for aberrations resulting from focusing on a close object.

2. The invention of claim 1, wherein the first lens sub-group consists of a single positive lens having an image side convex surface and the second sub-group consists of a negative meniscus single lens convex to the image side.

3. The invention of claim 2, wherein the first lens group has an image side convex surface.

4. The invention of claim 3, wherein the positive lens of the first lens sub-group has an object side concave surface.

5. The invention of claim 3, wherein the positive lens of the first sub-group has an object side convex surface.

6. The invention of claim 2, wherein the first lens group comprises, from the object to the image side, a positive meniscus lens convex to the object side, a first negative meniscus lens convex to the object side, an aperture stop and a second negative meniscus lens convex to the image side, the first negative meniscus lens consists of a positive lens element and a negative lens element cemented to the positive lens element at the image side thereof.

7. The invention of claim 6, wherein the positive meniscus lens of the first lens group consists of a single lens element and the second negative meniscus lens consists of a single lens element.

8. The invention of claim 2, wherein the first lens group comprises, from the object to the image side, a first positive lens, a biconcave lens, an aperture stop and a second positive lens.

9. The invention of claim 8, wherein one of the positive lenses of the first lens group consists of a cemented doublet and each of the other lenses of the first lens group consists respectively of a single lens element.

10. The invention of claim 2, wherein the first lens group comprises, from the object to the image side, a first positive meniscus lens convex to the object side, a second positive meniscus lens convex to the object side, a first negative meniscus lens convex to the object side, an aperture stop and a second negative meniscus lens convex to the image side.

11. The invention of claim 10, wherein the second negative meniscus consists of a negative lens element and a positive lens element cemented to the negative lens element at the image side thereof and each of the other respective lens elements of the first lens group consists of a single lens.

12. The invention of claim 1, wherein the position of the second lens sub-group is fixed relatively to the first lens group and the first lens sub-group is movable relatively to both the first lens group and the second sub-group for varying the first and second air spaces.

13. An objective lens system comprising a design parameter of approximately the values set forth within the following specification:

| f=1.0 FNo.=2ω=47° Back Focal Length S=0.71 | | | |
|---|---|---|---|
| Radius of Curvature | Axial Distance | Refractive Index | Abbe Number |
| $r_1$ = 0.666 | | | |
| | $d_1$ = 0.093 | $N_1$ = 1.6935 | $\nu_1$ = 50.3 |
| $r_2$ = 5.009 | | | |
| | $d_2$ = 0.004 | | |
| $r_3$ = 0.433 | | | |
| | $d_3$ = 0.084 | $N_2$ = 1.6700 | $\nu_2$ = 47.1 |
| $r_4$ = 0.695 | | | |
| | $d_4$ = 0.025 | | |
| $r_5$ = 1.400 | | | |
| | $d_5$ = 0.027 | $N_3$ = 1.6545 | $\nu_3$ = 33.9 |
| $r_6$ = 0.293 | | | |
| | $d_6$ = 0.248 | | |
| $r_7$ = −0.273 | | | |
| | $d_7$ = 0.024 | $N_4$ = 1.6477 | $\nu_4$ = 33.9 |
| $r_8$ = −3.777 | | | |
| | $d_8$ = 0.097 | $N_5$ = 1.6779 | $\nu_5$ = 55.5 |
| $r_9$ = −0.367 | | | |
| | $d_9$ = 0.003 | (dA:Variable) | |
| $r_{10}$ = 8.963 | | | |
| | $d_{10}$ = 0.07 | $N_6$ = 1.6935 | $\nu_6$ = 51.9 |
| $r_{11}$ = −0.577 | | | |
| | $d_{11}$ = 0.06 | (dB:Variable) | |
| $r_{12}$ = −0.423 | | | |
| | $d_{12}$ = 0.03 | $N_7$ = 1.6975 | $\nu_7$ = 48.3 |

-continued

| f=1.0 FNo.=2ω=47° Back Focal Length S=0.71 | | | |
|---|---|---|---|
| Radius of Curvature | Axial Distance | Refractive Index | Abbe Number |
| $r_{13}$ = −0.454 | | | − | wherein dA and dB refer to intralens air spaces.

14. A close focusing objective lens system for cameras comprising:

a first lens group including an aperture stop, and a positive refractive power second lens group adjacent to the first lens group at the image side thereof, the second lens group consists of a first lens element of a positive refractive power having an image side surface convex to the image side and a second lens element of a negative refractive power adjacent to the image side of the first lens element and having a concave object side surface and a convex image side surface, a first variable air space is formed between the first lens group and the first lens element which is increased as the object distance of the lens system is decreased, while a second variable air space is formed between the first lens element and the second lens element which is decreased as the object distance of the lens system is decreased, the variation in the respective first and second air spaces providing compensation for changes in aberrations resulting from focusing to a close object.

* * * * *

UNITED STATES PATENT AND TRADEMARK OFFICE
CERTIFICATE OF CORRECTION

PATENT NO. : 4,165,916
DATED : August 28, 1979
INVENTOR(S) : AKIYOSHI NAKAMURA

It is certified that error appears in the above-identified patent and that said Letters Patent are hereby corrected as shown below:

In Column 6, line 40 delete "58.3" and insert --48.3--.

In Column 9, line 2 delete "f=1.0FNo.=2ω=47°" and insert --f=1.0 FNo.=2 2ω=47°--.

Signed and Sealed this

First Day of April 1980

[SEAL]

Attest:

SIDNEY A. DIAMOND

Attesting Officer

Commissioner of Patents and Trademarks